UNITED STATES PATENT OFFICE.

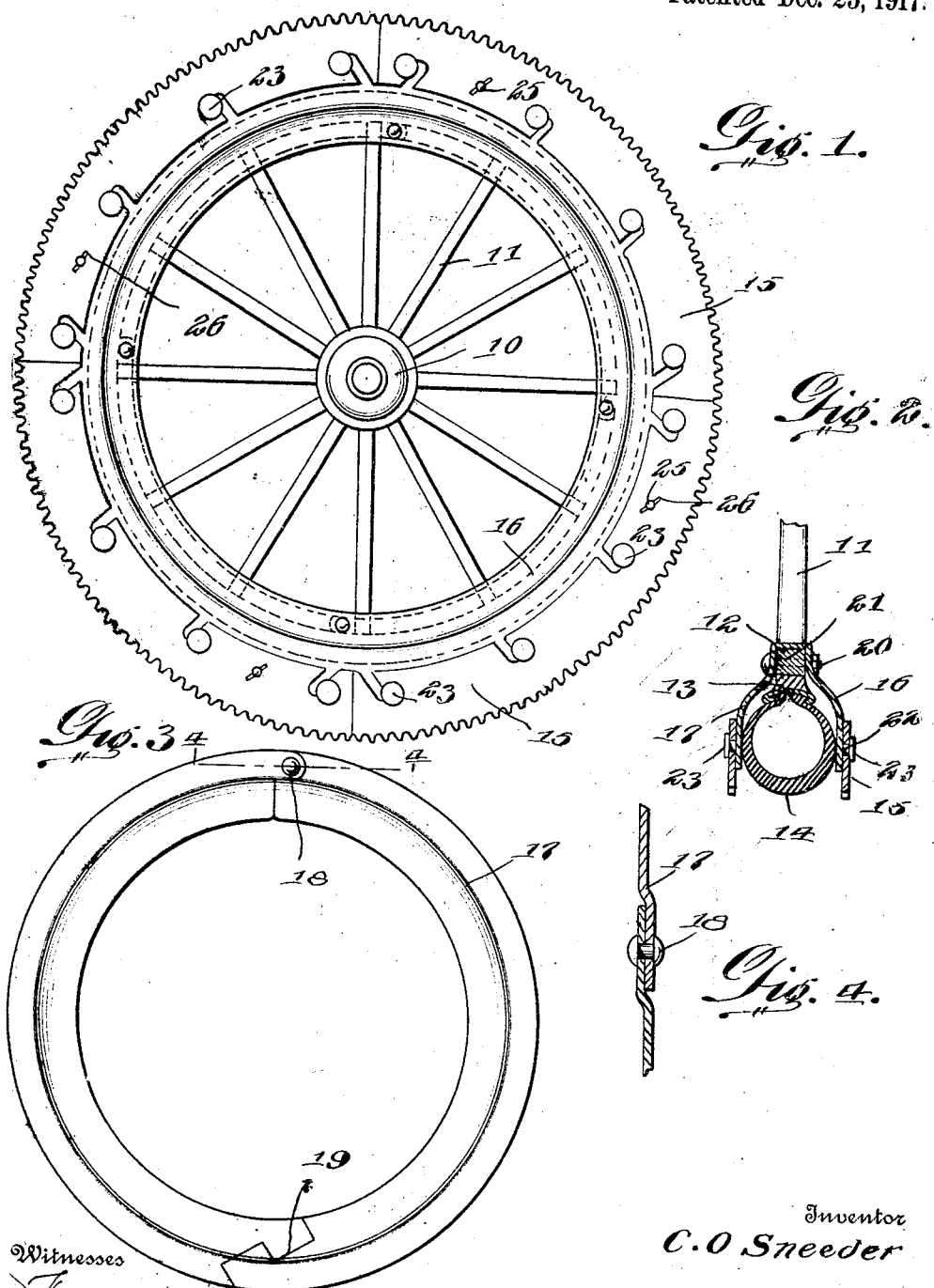

CHARLES O. SNEEDER, OF RIPLEY, OHIO.

TRACTION DEVICE FOR VEHICLE-WHEELS.

1,251,435.  Specification of Letters Patent.  Patented Dec. 25, 1917.

Application filed May 12, 1916. Serial No. 97,152.

*To all whom it may concern:*

Be it known that I, CHARLES O. SNEEDER, a citizen of the United States, residing at Ripley, in the county of Brown and State of Ohio, have invented new and useful Improvements in Traction Devices for Vehicle-Wheels, of which the following is a specification.

This invention relates to traction devices for vehicle wheels, the object of the present invention being to provide effective means applicable to and detachable from a vehicle wheel and especially wheels equipped with pneumatic tires, whereby, in the winter season, the wheel is enabled to obtain the necessary tractive hold or grip on the road surface whether ice or snow to successfully propel the vehicle in connection with which the wheel is used.

One of the principal objects of the present invention is to provide means of the character referred to which may be quickly applied to and removed from a wheel, the traction device when placed upon the wheel being securely held in a certain predetermined position.

With the above and other objects in view, the invention consists in the novel construction, combination and arrangement of parts, as herein described, illustrated and claimed.

In the accompanying drawings:—

Figure 1 is a side elevation partly broken away illustrating the traction device of this invention in its applied relation to a vehicle wheel.

Fig. 2 is a fragmentary cross section on an enlarged scale taken through the rim and tire and traction elements of this invention.

Fig. 3 is a side elevation of one of the annular carriers.

Fig. 4 is a fragmentary section on the line 4—4 of Fig. 3.

Referring to the drawings A generally designates a wheel embodying a hub 10, spokes 11 and a rim or felly 12, 13 designating the tire carrying rim and 14 a tire of the pneumatic type carried by said rim 13. All of the parts thus far described are of the usual construction and relative arrangement.

In carrying out the present invention, I employ a pair of annular traction rings 15 and also a pair of annular carriers 16 and 17 for said traction rings. In the preferred embodiment of this invention and in order to enable a tire to be removed quickly one of the annular carriers 16 is formed in one piece or of endless formation while the other annular carrier 17 is formed in a plurality of sections, two of such sections being preferably employed and the same being hinged together by a pivot 18. The adjacent end portions of the sections of the carrier 17 are reversely offset in relation to each other as shown in Fig. 4 to provide a lap joint and the pivot 18 which is shown in the form of a bolt passes through said offset and overlapped extremities. The opposite or free extremities are formed with a scarf joint 19 embodying a plurality of shoulders which interlock with each other when the free extremities of the sections of the carrier are moved laterally in relation to each other, which lateral movement is permitted by the flexibility of the carrier 17, the same being preferably composed of steel or other metal.

The carriers 16 and 17 are fastened in fixed relation to the felly of the wheel by means of bolts 20 any number of which may, of course, be employed, said bolts being preferably inserted through metal blocks 21 set into the wheel felly as indicated in Fig. 1. Each of the carriers 16 and 17 is provided on the outer face thereof with an annular series of studs 22 each having an enlarged head 23. Each of the traction rings 15 is composed of arcuate sections, four of such sections being illustrated in Fig. 1 although it will, of course, be apparent that the number of sections is immaterial. Each of the sections of each traction ring 15 is formed with a plurality of L-shaped or bayonet slots 24, the entrance portions of which extend in lines parallel to the radius of the wheel in order to enable each section to be slipped under the heads 23 of the studs 22 and then turned slightly so as to cause the studs 22 to occupy the ends of those portions of the slots which extend longitudinally of the felly of the wheel, thereby preventing the sections of the rings 15 from becoming displaced.

In order to insure the retention of the sections of the rings 15 in interlocking engagement with the carriers 16 and 17, I prefer to employ a locking device 25 which is shown in the form of a cap screw inserted through one of the sections of each traction ring as shown in Fig. 1, said cap screw being preferably provided with a winged head 26 to facilitate the manipulation thereof.

The outer peripheries of the carriers 16 and 17 terminate as shown in Fig. 2 considerably within the outer periphery or tread of the tire 14 so as not to interfere with the action of said tire when the machine is being operated solely upon the tires and without the traction rings. Said carriers also form a protection for the side walls of the tire, reducing the liability of the tire becoming punctured. When the traction rings are in their proper positions, they project slightly beyond the tread of the tire so as to give the necessary tractive grip or hold on the road surface in case the same is covered with ice or snow. The traction device as a whole also reduces the liability of lateral skidding of the vehicle. In applying the sections of each traction ring, the said sections are all preferably pushed inwardly under the heads of the studs 22 and when all of said sections are in longitudinal alinement with each other, the traction ring 15 as a whole is then turned sufficiently to cause all of the studs to lie in the end portions of the slots as shown in Fig. 1. To remove each traction ring, the operation just described is simply reversed.

Having thus described my invention, I claim:—

1. The combination with a vehicle wheel, of annular carriers arranged at opposite sides of the wheel felly and having a fixed relation to the wheel, headed studs projecting from the outer faces of said carriers, sectional traction rings provided with bayonet slots to receive said headed studs, whereby an interlocked engagement is obtained between the traction rings and their carriers by a partial rotative movement of said rings in relation to the carriers, and means for preventing relative longitudinal movement between said traction rings and carriers.

2. The combination with a vehicle wheel, of annular carriers arranged at opposite sides of the wheel felly and having a fixed relation to the wheel, headed studs projecting from the outer faces of said carriers, sectional traction rings provided with bayonet slots to receive said headed studs, whereby an interlocked engagement is obtained between the traction rings and their carriers by a partial rotative movement of said rings in relation to the carriers, and means for preventing relative longitudinal movement between said traction rings and carriers, one of said carriers embodying two substantially semi-circular sections pivotally connected together and overlapped at one end, and provided with an interlocking scarf joint at their free extremities.

In testimony whereof I affix my signature in presence of two witnesses.

CHARLES O. SNEEDER.

Witnesses:
 CHAS. T. LEMON,
 H. G. MADDOX.